Dec. 3, 1957 L. J. BULLIET ET AL 2,815,484
COMPLEX ELECTRICAL SYSTEM AND MEANS FOR TESTING SAME
Original Filed Jan. 3, 1947 11 Sheets-Sheet 1

Fig. 1.

INVENTORS.
Leander Jackson Bulliet
Nelson P. Bashor
By: Moore, Olson & Trexler
Attys.

Dec. 3, 1957 L. J. BULLIET ET AL 2,815,484
COMPLEX ELECTRICAL SYSTEM AND MEANS FOR TESTING SAME
Original Filed Jan. 3, 1947 11 Sheets-Sheet 8

Fig. 6A.

INVENTORS
Leander Jackson Bulliet
Nelson P. Bashor
By: Moore, Olson & Trexler
attys United States Patent Office 2,815,484
Patented Dec. 3, 1957

2,815,484

COMPLEX ELECTRICAL SYSTEM AND MEANS FOR TESTING SAME

Leander Jackson Bulliet and Nelson P. Bashor, Rockford, Ill., assignors to Odin Corporation, Chicago, Ill., a corporation of Illinois Continuation of application Serial No. 720,056, January 3, 1947. This application July 19, 1954, Serial No. 443,987

2 Claims. (Cl. 324—73)

This invention relates in general to electrical circuit apparatus, and more especially to equipment embodying a complex electrical system and improved testing means incorporated therewith and hence instantly operable for the detection of such faults, defects and other conditions, affecting the operation of the system, as may develop during the service life of the equipment. The present application for U. S. Letters Patent is a continuation of a prior application filed January 3, 1947, under Serial No. 720,056, now abandoned.

Many operable machines, in various arts and industries, include as a part of their control equipment, a more or less complex electrical system adapted for the operation or control of machine elements and functions. Such control systems may and commonly do comprise a multiplicity of circuits containing relays of various kinds, including relay switchs, limit switches and other electrically operable devices which of course are subject, from time to time, to failure or error in operation. For example, a relay may stick or bind and hence fail to operate. Relay or limit switch contacts, when brought into engagement, may fail to pass electrical current, as intended, due to the presence of accumulated dirt or other foreign matter upon the surfaces of the contacts.

The detection of an apparatus-stopping defect, in a complex electrical system, ordinarily requires the services of one or more skilled technicians having a thorough knowledge of the equipment, and may entail costly delay in the restoration of the equipment to operating condition until the fault is detected and corrected. The detection of a defect may also involve danger to service personnel in crawling over various electrified parts of the apparatus for the purpose of testing and inspecting the electrical control equipment in which the defect may exist. Where the machine is part of a production line, the delay may be especially costly not only in respect to the output of the defective machine, but also in respect to the output of auxiliary equipment dependent thereon.

An important object of the present invention is to provide improved means for testing complex electrical control circuits of machine structures or other operable apparatus; a further object being to provide for the performance of the testing operation at a conveniently located test panel remote from the equipment to be tested. More specifically stated, the present invention provides for quickly and easily testing electrical control circuits forming a more or less complicated electrical system, under conditions of improved safety and without requiring the services of highly skilled personnel.

A further object of the invention is to provide improved testing means for a complex electrical system, including a testing panel forming a diagram of the entire system and a multiplicity of test probe contacts electrically connected each with a corresponding test station in the electrical system and exposed at a point in the diagram depicting the said corresponding test station.

The foregoing and numerous other important objects, advantages and inherent functions of the invention will become apparent as the same is more fully understood from the following description, which, taken in connection with the accompanying drawings, discloses a preferred embodiment of the invention.

Referring to the drawings.

Figure 1:
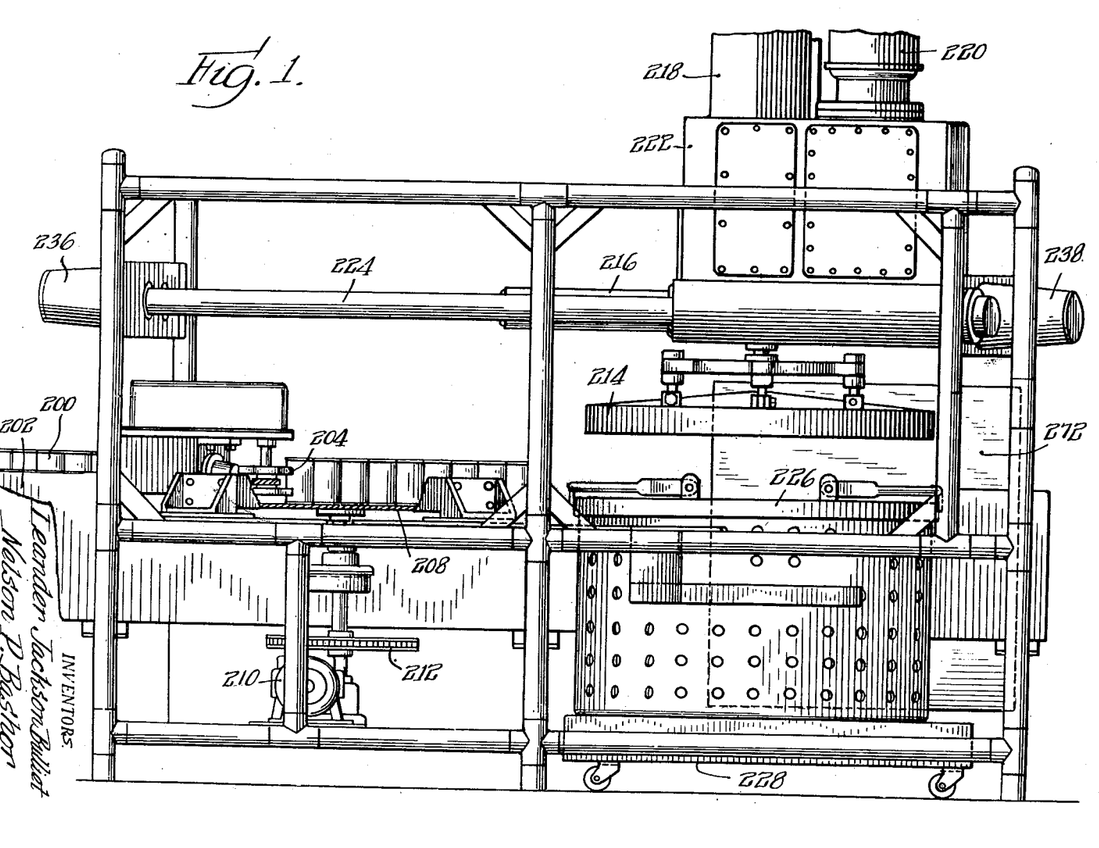
Fig. 1 is a general assembly view, in side elevation, of a can handling machine construced in accordance with and embodying the principles of the present invention.
Figure 2:
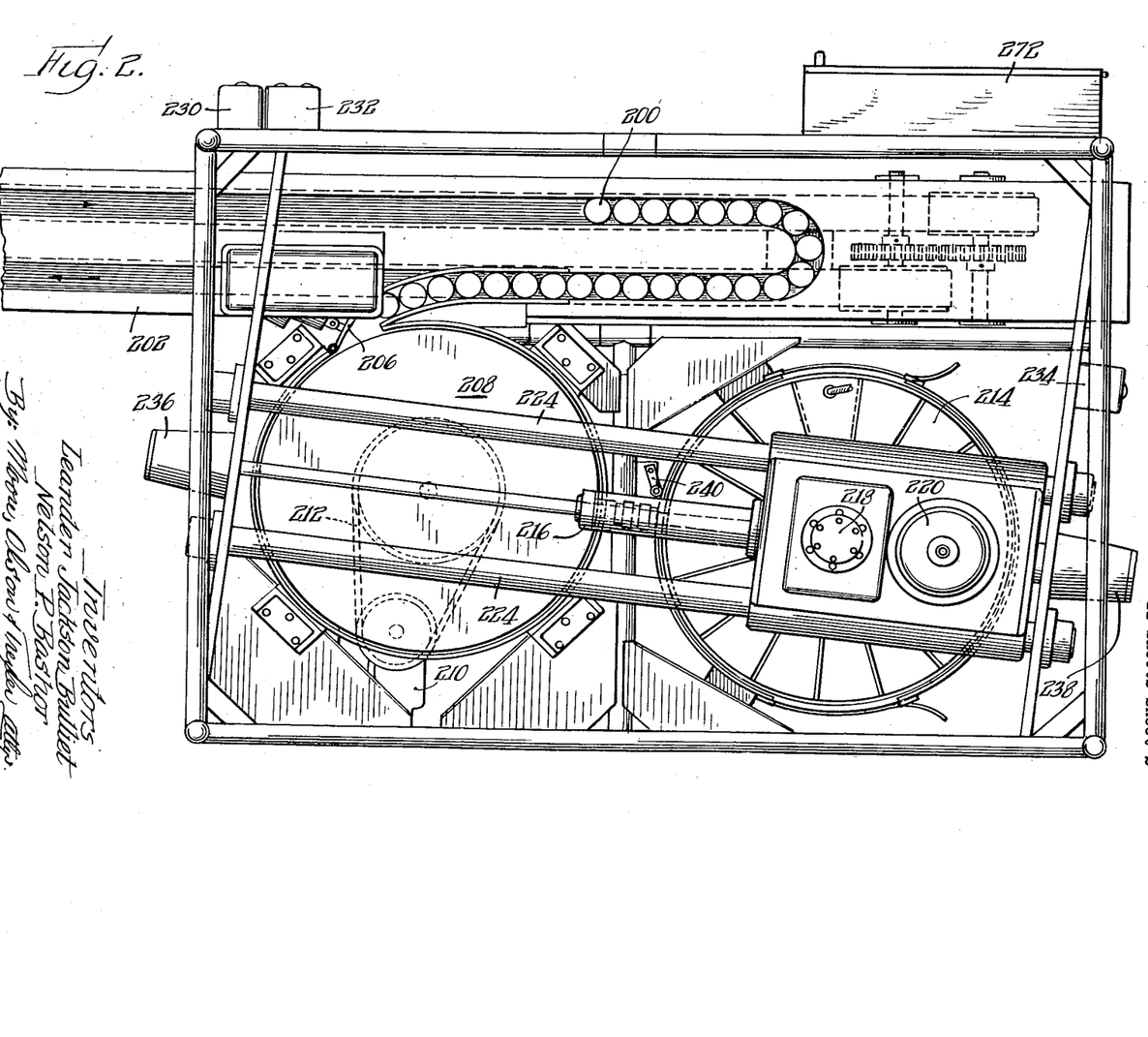
Fig. 2 is a plan view of the machine structure shown in Fig.1.
Figure 3:
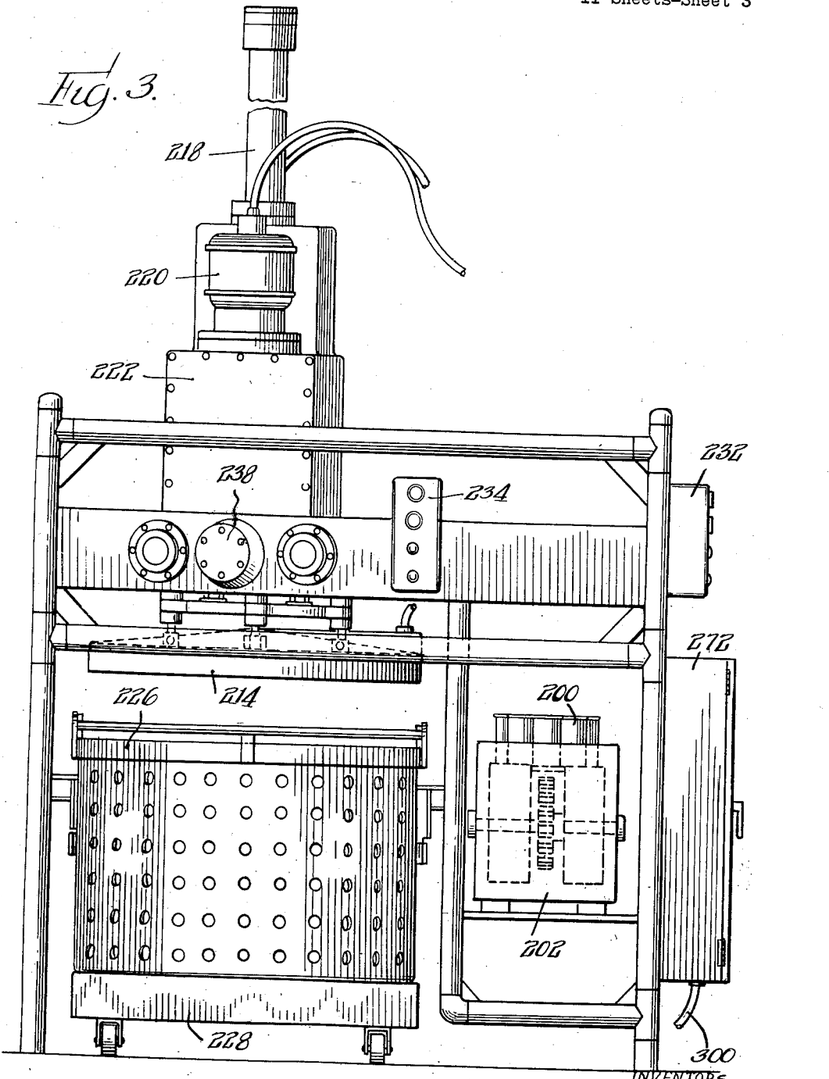
Fig. 3 is an end view of the machine, as seen from the right in Fig. 2.

To illustrate the invention, Figs. 1, 2 and 3 of the drawings disclose a complex mechanism of the sort in which the present invention may be advantageously applied, said mechanism, as shown, comprising a can handling machine adapted for the high speed automatic loading and unloading of retort baskets or receptacles, whereby filled cans may be loaded into a retort for the processing of the contents of the cans.

The complex can handling machine depicted in Figs. 1, 2 and 3 of the drawings and hereinafter more fully described is disclosed in detail in the copending applications for United States Letters Patent of Gustave J. Peterson et al., Serial No. 591,026, filed April 30, 1945, now Patent No. 2,609,108, and of Leander Jackson Bulliet, Serial No. 601,899, filed June 27, 1945, now Patent No. 2,609,133, such mechanism being relatively complex and thus particularly well suited to illustrate the utility and novel features of the preesnt invention. It should be understood, however, that the present invention is not necessarily limited to electrical systems used for the operation or control of a particular type or kind of machine, but may be usefully employed generally in connection with any electrical control circuit system, the invention having particular utility in conjunction with complex electrical systems wherein the testing difficulties heretofore mentioned have particular prominence.

In the complex machine shown in Figs. 1, 2 and 3, cans 200 may be delivered at high speed by means of a belt conveyor 202. From the conveyor the cans may be delivered past a counting and control star wheel 204, Fig. 1, and through a gate 206, Fig. 2, onto a rotatable table 208 upon which the cans may be formed into a predetermined pattern. The table may be driven by an electric motor 210 and associated drive transmission 212.

The counting and control star wheel 204 permits a predetermined number of cans to pass from the conveyor 202 onto the table 208, during the rotation thereof, to be formed into the desired pattern. After the passage of a predetermined number of cans, the star wheel is locked, the gate 206 closed, and the rotation of the table 208 stopped, in predetermined sequence.

A circular translating electromagnet 214 is arranged to be propelled in a horizontal direction by means of a hydraulic actuator 216, and in a vertical direction by means of an actuator 218, the pump forming a part of the hydraulic circuit being powered by an electric motor as indicated at 220. The traversing head 222 which carries the magnet 214 moves horizontally along guide bars 224, under propulsion of the horizontal actuator 216, the magnet being shiftable vertically in respect to the head under propulsion of the vertical hydraulic actuator.

Electrical solenoid actuator control valves are provided for controlling the functioning of the hydraulic actuators in predetermined timed sequence with each other and with the operation of the table 208, the arrangement being such that after the table has stopped, the electromagnet 214 moves downwardly into engagement with the tops of the cans assembled thereon, and the electromagnet thereupon energized. The electromagnet is then shifted, with the cans magnetically adhering thereto, upwardly to a position above the table, and then to the right to the position shown in Fig. 1, and downwardly so as to deposit a layer of cans into the receiving basket 226 mounted upon a shiftable loading truck 228, and which has previously been placed in proper receiving position.

The several functions of the machine may be effected under manual push button control, but normally are operated in a complete automatic cycle, the operator's control push button panels being illustrated at 230, 232 and 234 in Fig. 2. The automatic functioning may be controlled by a multiplicity of relay and limit switches, and other control elements, including solenoid actuated devices, such as valves, interlocked with each other and arranged to check each other so that all must be in proper position as each successive machine operation occurs. For example, the limits of movement of the head 222 in a horizontal direction, under propulsion of the horizontal hydraulic actuator 216, may be controlled by suitable limit switches mounted within the casing structures 236 and 238, these limit switches acting in conjunction with other control elements to control the operation of the solenoid valve which effects the starting, stopping, and reversal of the horizontal hydraulic actuator.

In like fashion, limit switches may be provided for controlling the vertical traverse of the electromagnet, the lowering limit switch being operable at various elevation levels depending upon the number of can layers previously deposited into the receiving basket when a new can layer is lowered. Control means may also be provided for automatically energizing and deenergizing the magnet 214, in timed relation with its traversing and positioning; and the functioning of the electromagnet in its movements is controlled in timed relation to the functioning of the counting star wheel 204, the gate 206, and the rotatable table 208, so that independent operation of the table and of the magnet is permitted to afford maximum speed of operation. At the same time interfering movement of the magnet and table is prevented so that the magnet may not be lowered onto the table when it is incompletely filled or rotating.

Various control interlocks are also provided, such for example as the interlock switch 240, Fig. 2, which requires that the receiving basket 226 be in proper position, and also that a filled receiving basket must have been removed and an empty one replaced, before the machine can again be started after having been automatically stopped after delivery of a predetermined number of can layers into the basket.

Figure 4:
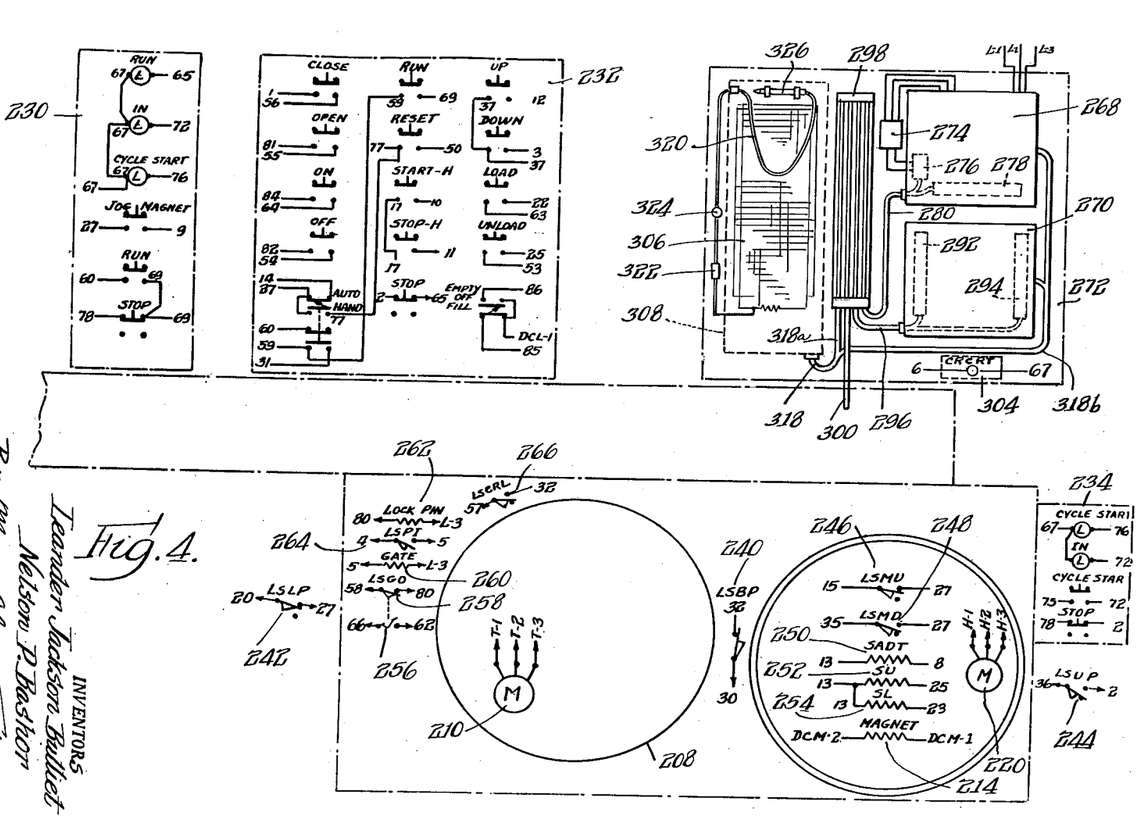
Fig. 4 is a diagrammatic layout of the various electrical elements which comprise the electrical control circuit of the machine, and to which the present invention particularly relates.

A schematic layout of the electrical control elements, in respect to their general positioning in the machine, is depicted in Fig. 4. It will be seen that the electrical control elements, in addition to the motors 210 and 220, the magnet 214, and the interlock switch 240 also include the aforementioned limit switches for controlling the horizontal hydraulic actuator designated at 242 and 244, as well as the limit switches for controlling the vertical hydraulic actuator, designated at 246 and 248. The circuit further includes the valve actuating magnets or solenoids 250, 252 and 254, a pair of limit switches 256 and 258 actuated in accordance with the position of the gate 206, a gate actuating solenoid 260, a solenoid 262 for actuating a lock pin associated with the gate structure, a limit switch 264 actuated in accordance with the lock pin position, and a limit switch 266 actuated in accordance with the movements of the counting star wheel 204. The various manual switch controls and indicators associated with the operator's control panels 230, 232 and 234 are appropriately designated in Fig. 4, and a specific description thereof is believed to be unnecessary.

The apparatus further may include a pair of relay panels or boxes 268 and 270, Fig. 4, which may conveniently be mounted within the casing 272, shown in Figs. 1, 2 and 3, suitably carried by the frame of the machine. The relay panel 268 is adapted for connection to a suitable power source, such as a 440 volt A. C. power supply line, and has associated therewith a rectifier 274, Fig. 4, for supplying D. C. power for the operation of the electromagnet 214. The relay panel is provided with a pair of connector strips 276 and 278 having connection terminals adapted for connection with the conductors of a cable 280.

Figure 5:
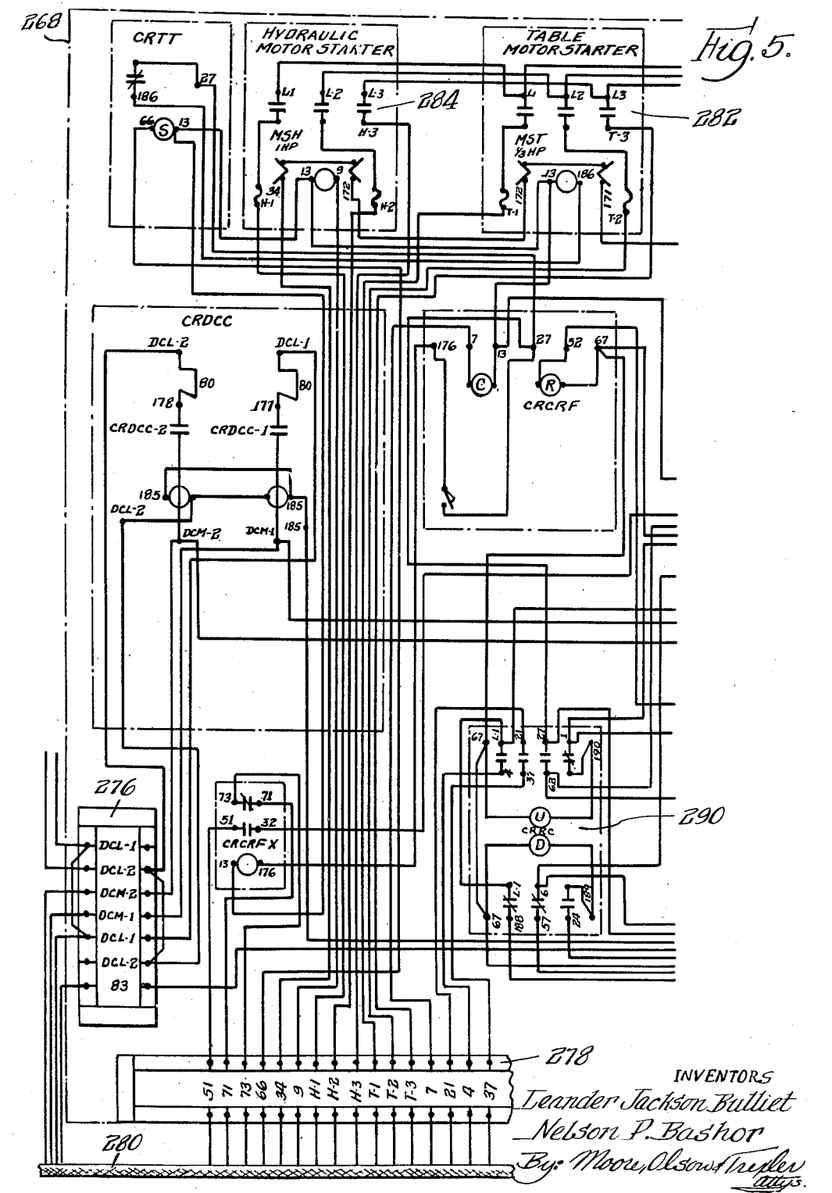
Figs. 5 and 5A comprise an electric circuit diagram for one of the relay panels formed as a part of the machine.
Figure 5A:
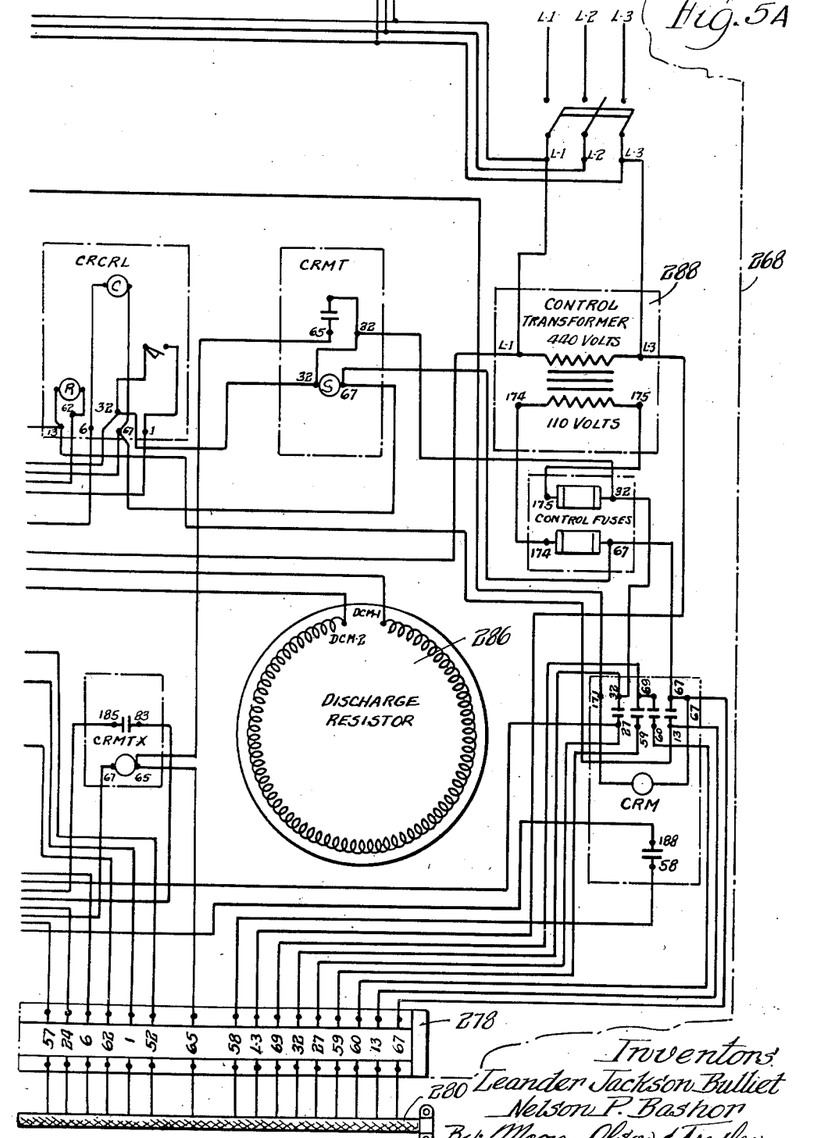

The details of the control elements, and their connections, forming the relay panel 268 are shown in Figs. 5 and 5A, a detailed description thereof being unnecessary to an understanding of the present invention; suffice to say that the panel includes the starting contact boxes 282 and 284 for the motors 210 and 220, respectively, a discharge resistor 286 for preventing undue current surge in the operation of the electromagnet 214, and a control transformer 288 for supplying A. C. current at reduced voltage for the control circuit of the machine. This control circuit, as has been previously set forth, includes a number of relays, some nine of which are in the relay panel 268 and are indicated in Figs. 5 and 5A bearing appropriate letter designations. The relay indicated at 290 is of the mechanically held type and bears appropriate "U" (up) and "D" (down) designations. The actuation of the up coil of the relay closes one set of contacts and opens the other, the relay then being mechanically held in this position until the down coil is actuated which opens the closed contacts and closes the open contacts, the relay again being mechanically retained in the actuated position.

Figure 6:
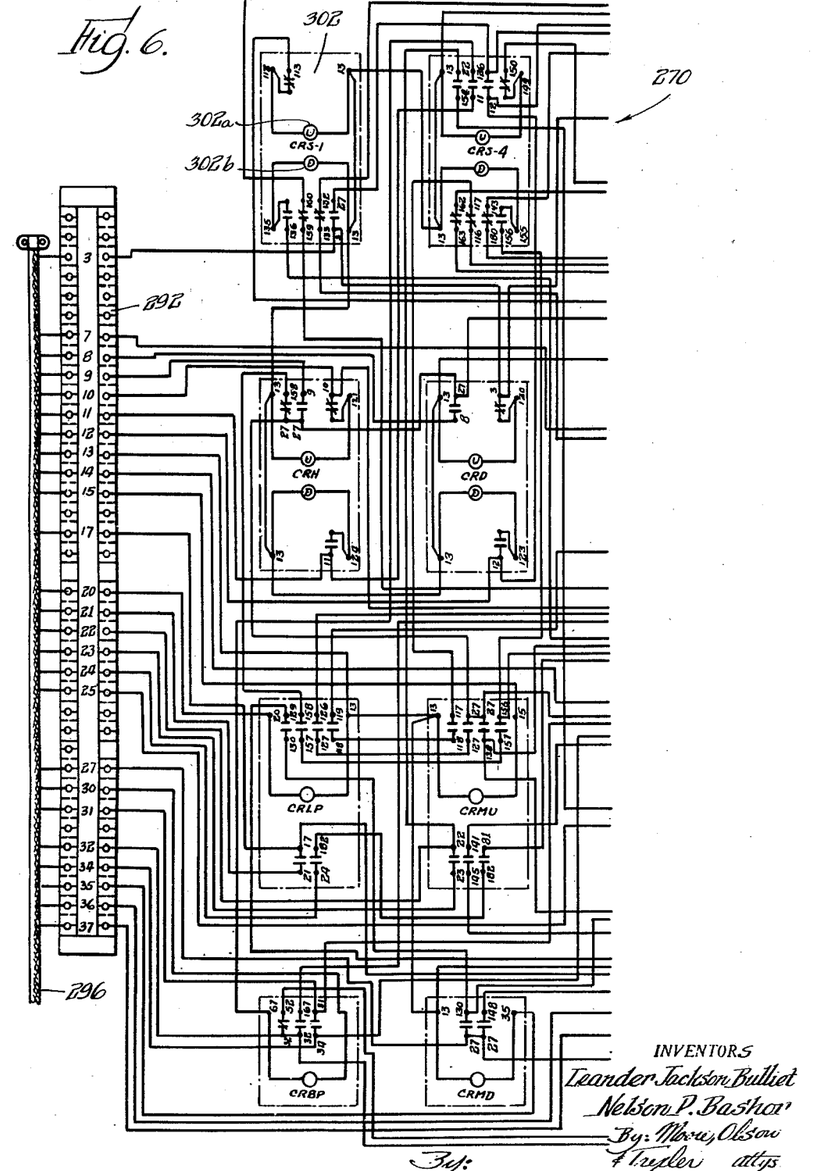
Figs. 6 and 6A comprise an electric diagram for the other relay panel forming a part of the electrical control circuits.
Figure 6A:
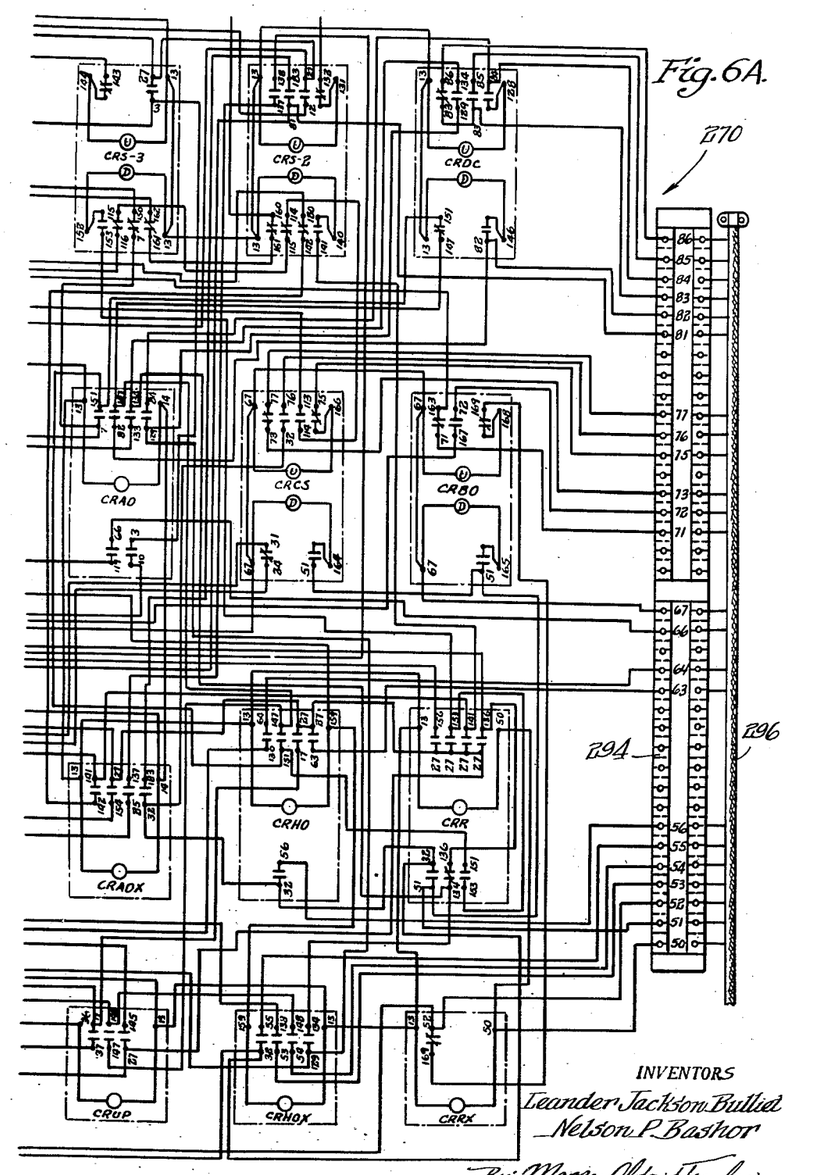

The relay panel 270 is specifically illustrated in Figs. 6 and 6A. It will be seen that it comprises some twenty relays, several of which are of the mechanically held type, the various connections from the relay contacts leading to each other, as indicated, and to terminal or connector strips 292 and 294 from which the outgoing connections are made to a cable as indicated at 296 leading outwardly from the relay box.

Figures 8, 9, 10, 11:
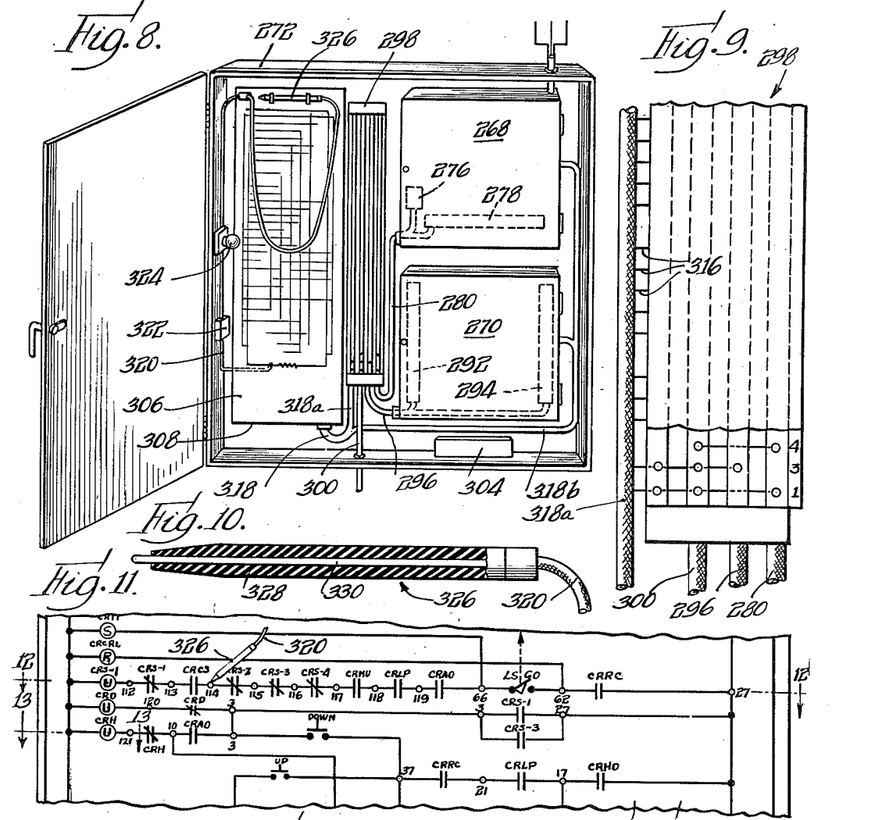
Fig. 8 is a detail view of the control box more particularly relating to the present invention.
Fig. 9 is an enlarged detail view of one of the connector panels or terminal strips within the control box.
Fig. 10 is an enlarged detail view of the testing member or feeler.
Fig. 11 is an enlarged detail of a part of the line diagram test board arranged within the control box structure.
Figure 12:
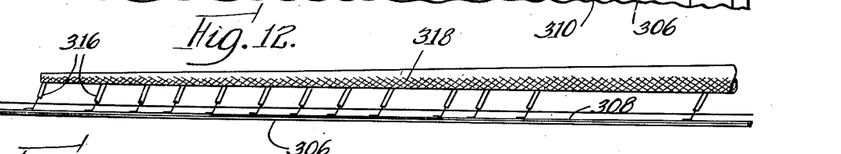
Fig. 12 is a sectional view of the test board portion illustrated in Fig. 11, taken as indicated by the line 12—12 thereof.

The various numbered connections from the connector strips of the relay panels are interconnected with each other and with the connections leading to the various control elements on the machine, in accordance with the numbers they bear, through the intermediary of a connector panel 298, Figs. 4 and 9. Thus it will be seen that the cables 280 and 296 from the respective relay panels lead to the connector panel 298, along with a cable 300 through which extend the connections to the machine parts, correspondingly numbered wires being interconnected at the connector panel, as indicated in Fig. 9. The various wires of the circuit all bear reference numbers (below 200) in Figs. 4, 5, 5A, 6 and 6A so that the connections can be traced, if desired.

Figure 7:
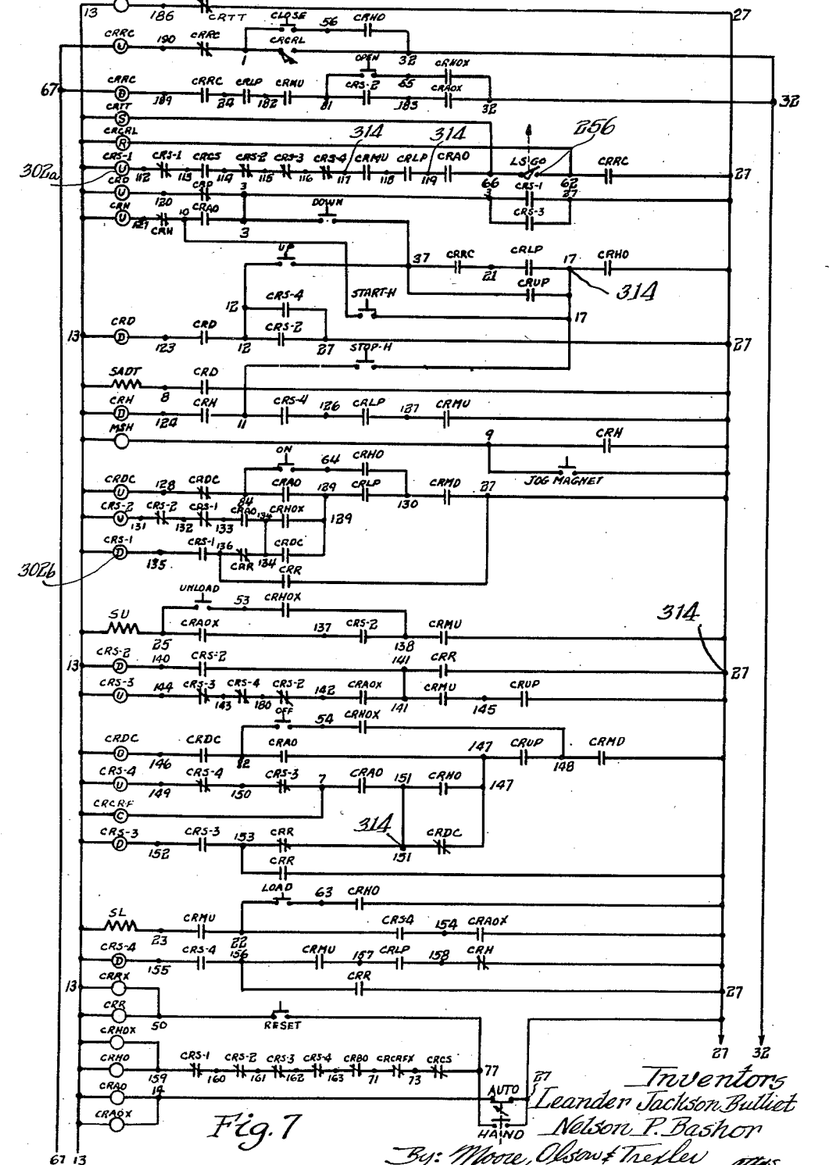
Figs. 7 and 7A comprise a line diagram for the entire machine.
Figure 7A:
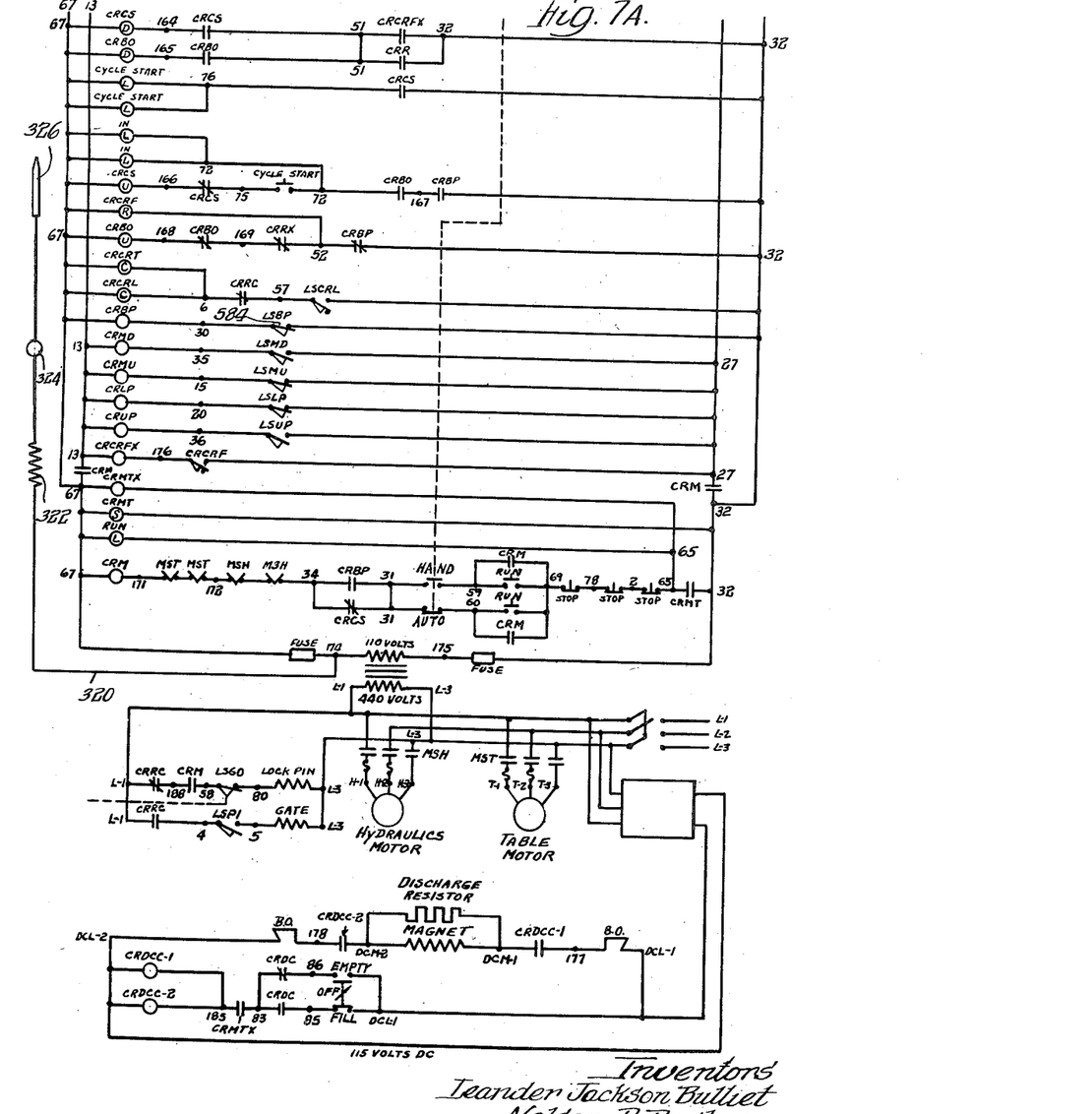

Figs. 7 and 7A show a line diagram for the complete machine. In the line diagram illustrated, the layout differs from the wiring as shown in Figs. 5, 5A, 6 and 6A in that the control contacts for the various relays and other actuated parts are shown in direct association with such parts, irrespective of the actual physical locations of the contacts. By way of illustration, reference may be made to the Step relay CRS–1, which is one of four step relays operable in the automatic cycling of the machine. This relay is designated by the reference numeral 302 in Fig. 6, the up coil thereof being indicated at 302a and a down coil being indicated at 302b in Fig. 7. It will be seen that the energization of the relay up coil is controlled by one normally closed checking contact of the CRS–1 relay itself; a normally open contact of the CRCS Cycle Start relay; a normally closed contact of the CRS–2 Step relay; a normally closed contact of the CRS–3 Step relay; a normally closed contact of the CRS–4 Step relay, a normally open contact of the CRMU Magnet Up relay which checks the magnet vertical position; a normally open contact of the CRLP Loading Position relay which checks the magnet horizontal position; a normally open contact of the CRAO Automatic Operation relay which checks the fact that the machine is properly set for automatic operation; the contacts of the LSGO gate switch 256; and a set of normally open contacts of the CRRC Counter relay which functions in accordance with the number of can layers already deposited within the receiving basket. When all of the foregoing ten sets of contacts are properly closed, the up coil 302a of the CRS–1 Step relay is energized by the 110 volt power lines 13 and 27 which, in the operation of the machine, causes the magnet 214 to move downwardly so as to engage and remove a set of assembled cans from the table 208.

It will be seen that the checking of the energizing circuit for the coil 302a is an involved undertaking by referen to the relay panel and machine circuits, wherein the various control contacts are variously positioned, in many instances at a point considerably removed from the part which is controlled. However, in the line diagram of Fig. 7 the entire ten contacts of the energizing circuit are shown in direct proximity to the coil 302a, in proper operating relationship therewith.

Each circuit element forming a part of the machine, or a part of the relay panels 268 and 270, and including also the Totalizer counter 304, Fig. 4, is to be found in Figs. 7 and 7A, correspondingly designated, the various electrical wires bearing the same reference numerals (below 200) as in Figs. 4, 5, 5A, 6 and 6A.

In accordance with the present invention the line diagram of Figs. 7 and 7A is reproduced within the relay panel casing 272, and the various numbered wires thereof are all electrically interconnected with the correspondingly numbered wires in the actual machine.

Figure 13:
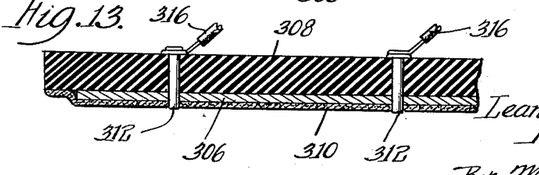
Fig. 13 is a sectional view of a portion of the test board, taken as indicated by the line 13—13 of Fig. 11, and set forth on a still further enlarged scale to illustrate the details of construction.

More particularly, referring to Figs. 4, and 8–13, a sheet of paper or other suitable sheet material 306, Fig. 13, upon which the line diagram of Figs. 7 and 7A has been printed, is adhesively or otherwise secured to a support panel 308 of suitable insulating material; the support panel being permanently mounted within the casing 272 as indicated in Figs. 4 and 8. To protect the face of the diagram, and to provide a durable structure, the diagram sheet is preferably covered with a transparent protective coating such as lacquer, as indicated at 310, Fig. 13.

A plurality of metal pins or contacts 312 are carried by the panel 308, the exposed ends of these pins projecting through the lacquer surface so that electrical contact therewith may be established. There is one pin for each numbered wire in Figs. 7 and 7A, projecting through the panel at the location of the wire, for example as indicated by the points 314 in Fig. 7. As will be understood, each numbered wire on the line diagram need be provided with only one pin, although some wires have been designated by numeral several times in Figs. 7 and 7A, for convenience of reference. If it is deemed desirable, for convenience, to likewise employ several pins for one wire, at various junction points along the length thereof, the several pins intersecting any one wire will be electrically interconnected by suitable wire connections at their rear ends so as to form in effect a single electrical contact.

Each contact pin is connected by means of a wire 316 with the numbered terminal corresponding to the pin, provided in the actual machine circuit. The cable by which the various wires 316 are thus interconnected to the machine circuit is indicated by the reference numeral 318 in Figs. 4, 8, 9 and 12. It will be seen that this cable has two branches as indicated at 318a and 318b. Cable 318a leads to the connector panel 298 wherein the wires 316 are interconnected with the correspondingly numbered wires from the machine and from the relay panels which extend to the connector panel through cables 280, 296 and 300. Cable branch 318b, in the particular embodiment illustrated, extends to the relay panel boxes for direct connection with the correspondingly numbered wires lying wholly within the relay panels, by any suitable means. Preferably in the particular embodiment illustrated, the connector panel 298 is employed only as an interconnecting means between the two relay panels, and between the relay panels and the machine; those wires which merely connect relay contacts within a given relay panel not being extended through the cable 280 or the cable 296, as the case may be. The wires 316 of the indicators are interconnected with such relay panel wires directly through the cable 318b. As is obvious, all of the numbered wires of the relay panels may be brought out to the connector panel 298, if desired, and interconnected with the indicator wires 316 by means of cable 318a. To avoid confusion, the connections between the ends of wires 316 and the various numbered wires within the relay panel boxes are not illustrated in Figs. 5, 5A, 6 and 6A.

As best shown in Figs. 7A and 8, a sensing wire 320 is connected with the pin 174 of the indicator board, this wire leading through a resistor 322, an indicator lamp 324, and terminating in an indicator member or feeler 326, the details of which are shown in Fig. 10. The feeler or test member 326 may conveniently comprise a pencil-like body 328 of insulating material within which is embedded a metal bar or feeler 330 connected with the end of the wire 320. It will be seen that when the door of the casing 272 is open, as shown in Fig. 8, the contact bar 330 of the pencil-like feeler member may be selectively engaged with the exposed end of any one of the pins 312, as may be desired. This operation may be effected while the control circuit of the machine is energized, without danger or hazard to the operator.

Assume for example that the machine should fail to function at that stage in its automatic cycle when the lifting magnet 214 should begin its traverse downwardly toward the cans assembled upon the table 214. By reference to a resume description of the operation of the machine it can be ascertained that this particular portion of the machine cycle is controlled by the Step rely CRS–1, the up coil 302a of which should be energized to initiate the downward travel of the magnet. By engaging the feeler with contact pin 112 the condition of the circuit may be readily ascertained. If all of the ten sets of contacts in the energizing circuit for the coil 302a are properly closed, current will flow from the power line 27 on one side of the control circuit transformer, through the ten sets of closed contacts in the actual machine circuit, and thence through the line diagram indicator pin 112, feeler 326, lamp 324, resistor 322 and wire 320 to the return side of the control circuit transformer. If, however, any one of the sets of contacts shall have failed to close, because of dirt, or the sticking of its actuating relay, or any other cause, the contact set that has failed to close may be readily ascertained by progressively engaging the feeler 326 with the contact pins 113, 114, 115 etc., moving progressively toward the power line 27, while watching the action of the indicator lamp 324. If the failure to operate, for example, is due to failure of the contacts of the CRCS relay to close, this will readily appear due to the fact that the contact pin 113 will be dead, and the contact pin 114 will be live and the lamp 324 will light. The cause of failure may thus be localized at the contacts of the CRCS relay, whereupon the contacts may be inspected and cleaned; or the condition of the CRCS relay may first be checked to ascertain its condition by further manipulation of the test board indicator.

It will thus be seen that the present invention relates to the operation of apparatus comprising a machine and an associated electrical system for controlling the operation of the machine and including improved testing means incorporated with said system whereby functional machine failure due to faulty operation or failure in the circuits of the electrical system may be ascertained quickly, easily and safely. In this connection it may be noted that testing may be accomplished with power applied to the control circuit, yet without danger to the operator should the machine inadvertently start in operation. Also, there is no danger of electrical shock, such as may result from work with the actual machine parts and circuits while the control circuit is energized. The circuit diagram may be studied simultaneously with the testing operations, as the entire circuit is before the operator during the testing, which further facilitates the operations. Skilled technicians are not required and the down time of the machine for any given trouble is materially shortened.

It is to be noted that the feeler and indicator circuit does not short the contacts being tested, as is the case where test bells or lamps are applied to the actual contacts in the machine circuit, in accordance with conventional methods. The actual machine contacts are touched or inspected only after the difficulty has been found to lie therein, and this may be done with the control circuit deenergized. The panel board mounting preserves the diagram intact, and in proximity to the machine, during its operating life.

In the particular circuit illustrated, the test indicator has been applied only to the 110 volt A. C. control circuit. Obviously, if desired, similar indicating means may be applied to the 440 volt motor circuit, or to the D. C. control circuit, the resistor corresponding to the resistor 322 being appropriately varied in accordance with the voltages encountered.

It is thought that the invention and its numerous attendant advantages will be fully understood from the foregoing description, and it is obvious that numerous changes may be made in the form, construction and arrangement of the several parts without departing from the spirit or scope of the invention, or sacrificing any of its attendant advantages, the form herein disclosed being a preferred embodiment for the purpose of illustrating the invention.

The invention is hereby claimed as follows:

1. An electrical control system for an operable machine comprising a plurality of electrically energized machine actuating circuits interconnected with a common power source and each circuit embodying a plurality of circuit components such as position sensing switches, actuating coils and switch contacts operatively associated therewith, and electrical conductors interconnecting said coils, switches and contacts whereby to effect a desired sequence of operation of the machine, a sensing switch in at least one of said circuits being connected to control the delivery of energizing power from said source through a said coil, and a relay switch controllingly associated with said coil and connected in another of said circuits, to control the operation thereof, and a circuit testing device for testing said circuits, a test panel having a diagrammatic representation of said circuit thereon, a plurality of metal contact elements fixed on the test panel and each located on said diagram at a locus therein corresponding with a test station in one of said component interconnecting conductors, an electrical conductor leading from each contact element on the diagram to the corresponding component interconnecting conductor in said control system, a test probe adapted to be selectively engaged with said contact elements, and a current sensitive indicator electrically connected between the test probe and one side of said electrical energy source.

2. An electrical control system for an operable machine comprising a plurality of electrically energized machine actuating circuits interconnected with a common power source and each circuit embodying a plurality of circuit components such as position sensing switches, actuating coils and switch contacts operatively associated therewith, and electrical conductors interconnecting said coils, switches and contacts whereby to effect a desired sequence of operation of the machine, a sensing switch in at least one of said circuits being connected to control the delivery of energizing power from said source through a said coil, and a plurality of relay switches controllingly associated with said coil and connected each in a corresponding one of several of said circuits, to control the operation thereof, a circuit testing device for testing said circuits, a test panel having a diagrammatic representation of said circuits thereon, a plurality of metal contact elements fixed on the test panel and each located on said diagram at a locus therein corresponding with a test station in one of said component interconnecting conductors, an electrical conductor leading from each contact element on the diagram to the corresponding component interconnecting conductor in said control system, a test probe adapted to be selectively engaged with said contact elements, and a current sensitive indicator electrically connected between the test probe and one side of said electrical energy source.

References Cited in the file of this patent

UNITED STATES PATENTS

| | | |
|---|---|---|
| 1,370,751 | Kroupa | Mar. 8, 1921 |
| 1,565,578 | McDonough | Dec. 15, 1925 |
| 1,705,301 | Miller | Mar. 12, 1929 |
| 1,784,978 | Taylor | Dec. 16, 1930 |
| 1,968,039 | Hornberger | July 31, 1934 |
| 2,010,338 | White | Aug. 6, 1935 |
| 2,044,546 | Ryan et al. | June 16, 1936 |
| 2,103,501 | Waldron et al. | Dec. 28, 1937 |
| 2,315,420 | Harrington | Mar. 30, 1943 |
| 2,374,800 | Bohlke | May 1, 1945 |

OTHER REFERENCES

"Radio News," February 1944, pp. 191–194, 412, 414 and 416.